2,989,553
PROCESS FOR THE PREPARATION OF 20-MONO-
ENOL ACYLATES OF 11,20-DIKETO STEROIDS
Pieter Modderman, Willem Jacob van der Burg, and
Leendert Antonius van Dijck, Oss, Netherlands, assignors to Organon Inc., West Orange, N.J., a corporation of New Jersey
No Drawing. Filed Oct. 15, 1959, Ser. No. 846,546
Claims priority, application Netherlands Nov. 12, 1958
1 Claim. (Cl. 260—397.45)

The invention relates to a process for the preparation of a 20-mono-enol acylate of an 11,20-diketo-steroid by reacting the steroid with a carboxylic anhydride in the presence of an organic solvent and an acid.

More particularly the invention relates to a process for the preparation of a 20-mono-enol acylate of an 11,20-diketo-steroid by reacting the steroid with a carboxylic anhydride in the presence of an organic solvent and a possibly substituted benzene sulphonic acid containing at least one nitro group in the benzene nucleus.

A number of important corticosteroids are substituted in 17α-position by a hydroxyl group. In the synthesis of the steroids in question this group is usually introduced into 11,20-diketo-steroids which have been formed as intermediates in the decomposition of bile acids or of certain sapogenins.

Kritchevsky et al. described such a conversion in J. Am. Chem. Soc. 74, page 483 (1956), which is characterized in that the 3α-hydroxy-11,20-diketo-pregnane is converted into the 11,20-dienol-acetate by means of acetic anhydride, oxidizing with perbenzoic acid to the 17,20-oxido compound and finally hydrolyzing this compound to the desired 3α,17α-dihydroxy-11,20-diketo-pregnane. The authors of said article have found out that the double bond between the carbon atoms 9 and 11 in the 11,20-dienol acetate is not attacked by the peracid as a result of which the 11-keto group is again reformed in the hydrolysis.

It has appeared, however, that on oxidation of 11,20-dienol acylates of steroids of the allo-series the double bond between the carbon atoms 9 and 11 is oxidized indeed, as a result of which a mixture is formed of the 9,11-oxido-, 17,20-oxido- and the 9,11-17,20-dioxido compound.

So in order to render the method described by Kritchevsky practically possible also for the conversion of 11,20-diketo-steroids of the allo-series, it is essential in this series to start from a 20-mono-enol acylate.

According to the method described in the Dutch Patent 88,994 a 20-mono-enol acylation of 11,20-diketo-steroids can be attained by performing the acylation in the presence of perchloric acid.

A drawback of this method is that owing to the oxidative properties of the applied perchloric acid decomposition of the pregnane side chain of the 20-keto steroids takes place, which affects the yield of this process unfavourably.

Now it was surprisingly found that a 20-mono enol acylate of 11,20-diketo-steroids can be prepared if the acylation reaction is carried out in the presence of a possible substituted benzene sulphonic acid containing at least one nitro group in the benzene nucleus.

The use of these acids has not only the advantage that both in the normal and in the allo series exclusively 20-mono-enol acylates are obtained, but also that according to this method in the normal series higher yields of the desired 17-hydroxy steroid are obtained than according to the original method via the 11,20-dienol acylate.

In comparison with the use of perchloric acid the process according to the invention gives higher yields both in the normal and in the allo series, which is due i.a. to the fact that the benzene sulphonic acids have no oxidative properties and do consequently not give rise to decomposition of the pregnane side chain.

By a benzene sulphonic acid, whether or not substituted, is understood the benzene sulphonic acid as such and benzene sulphonic acids having besides one or more nitro groups one or more other substituents, such as a hydroxyl group, a halogen atom, an amino group, a carboxyl group or an alkyl group, for example, a methyl group. By said acids are also understood benzene sulphonic acids, the benzene nucleus of which is condensed with another aromatic nucleus. As examples of the relative acids are mentioned: mono-nitro benzene sulphonic acids, for example ortho-nitro benzene sulphonic acid, 2,4-dinitro benzene sulphonic acid, 2,4,6-trinitro benzene sulphonic acid, 2,6-dinitro para-toluene sulphonic acid and 2,4-dinitro naphthyl sulphonic acid.

In particular the sulphonic acids selected from the group consisting of benzene sulphonic acid and toluene sulphonic acid having 2 or 3 nitro groups, give high yields to the desired 20-mono-enol acylate.

The acylation reaction according to the invention is usually carried out by dissolving the 11,20-diketo steroid in a suitable organic solvent and adding a mixture of a carboxylic anhydride and a benzene sulphonic acid.

The reaction according to the invention can be carried out with any carboxylic anhydride. Preferably an aliphatic carboxylic anhydride derived from a carboxylic acid with 2 to 6 carbon atoms is applied.

As solvents are preferably applied a halogenated hydrocarbon, such as 1,2-dichloro-ethane or carbon tetrachloride, but also other solvents, such as ethers and dioxane, are useful.

The reaction can be carried out at different temperatures, dependent on the solvent and the duration of the reaction, but in general temperatures between —20 and 80° C. are applied.

The amount of benzene sulphonic acid usually amounts to 0.1 to 15% by weight of the steroid.

The yield can be determined by separating the obtained 20-enol acylate in a known manner, such as by extraction and crystallization, but usually the yield is determined of the 17-hydroxy-20-keto steroid which is obtained by oxidizing the reaction product with a peracid to the corresponding 17,20-epoxide and then hydrolyzing this compound.

The following examples illustrate the invention.

*Example I*

5 g. of 2,4-dinitro benzene sulphonic acid are added to a solution of 100 g. of 3α-acetoxy-11,20-diketo pregnane in 350 ml. of carbon tetrachloride and 150 ml. of acetic anhydride. Then the reaction mixture is left to stand at room temperature for 16 hours, after which it is poured into water. The layer of carbon tetrachloride is separated, washed with water, and then evaporated to 175 ml. under reduced pressure.

From paper chromatographic analysis of a sample of this tetra solution it appears that the $\Delta^{17(20)}$-3α,20-diacetoxy-11-keto-pregnene has been obtained in a yield of 98% of the theoretical.

Subsequently 635 ml. of a 0.85 M solution of mono perphthalic acid in ethyl acetate are added to the resulting tetra solution, after which this mixture is left to stand overnight at room temperature. The reaction mixture is then washed with 1 N sodium hydroxide, then with water till neutral and subsequently evaporated to dryness. The residue is dissolved in 1200 ml. of ethanol, after which a solution of 80 g. of sodium hydroxide in 500 ml. of water is added to this solution. Then the mixture is saponified in a nitrogen atmosphere at 25° C. for 40 minutes and then neutralized with glacial acetic acid. After distilling off the alcohol in vacuo the mixture is finally poured into 1200 ml. of water in which a precipitate of 3α,17α-dihydroxy-11,20-diketo-pregnane is formed. This precipitate is filtered off. Yield 91 g., or 97% of the theoretical. Melting-point 197–200° C. After crystallization from acetone 86.2 g. of pure substance are obtained of melting-point 201–203° C.

By replacing the above-mentioned acetic acid anhydride by an equivalent quantity of propionic acid anhydride or butyric acid anhydride the 3α,17α-dihydroxy-11,20-diketopregnane is obtained, the yield being substantially the same.

*Example II*

2 g. of 2,4-dinitro benzene sulphonic acid are added to a solution of 20 g. of 3β-acetoxy-11,20-diketo-allo-pregnane in 70 ml. of carbon tetrachloride and 30 ml. of acetic anhydride, after which the reaction mixture is left to stand at 0° C. for 18 hours. Then the mixture is processed as described in Example I, in which a solution of $\Delta^{17(20)}$-3β,20-diacetoxy-11-keto-allopregnene in carbon tetrachloride is obtained. According to paper chromatographic analysis of a sample of this solution the desired enol acetate has been obtained in a yield of 97% of the theoretical.

According to the process described in Example I the thus obtained compound is converted into the 3β,17α-dihydroxy-11,20-diketo-allopregnane in a yield of 18.2 g. After crystallization from acetone 17.1 g. of the pure substance is obtained with $[\alpha]_D = +60°$ (dioxane).

*Example III*

2 g. of 2,4,6-trinitro benzene sulphonic acid are added to a solution of 100 g. of 3α-acetoxy-11,20-diketo-pregnane in 350 ml. of carbon tetrachloride and 150 ml. of acetic anhydride. Then the reaction mixture is left to stand at room temperature for 150 minutes, after which it is poured into water. The layer of carbon tetrachloride is separated, washed with water, and then evaporated to 175 ml. under reduced pressure.

From paper chromatographic analysis of a sample of this tetra solution it appears that the $\Delta^{17(20)}$-3α,20-diacetoxy-11-keto-pregnene has been obtained in a yield of 98% of the theoretical.

Subsequently 635 ml. of a 0.85 M solution of mono perphthalic acid in ethyl acetate are added in the resulting tetra solution, after which this mixture is left to stand overnight at room temperature. The reaction mixture is then washed with 1 N sodium hydroxide, then with water till neutral and subsequently evaporated to dryness. The residue is dissolved in 1200 ml. of ethanol, after which a solution of 80 g. of sodium hydroxide in 500 ml. of water is added to this solution. Then the mixture is saponified in a nitrogen atmosphere at 25° C. for 40 minutes and then neutralized with glacial acetic acid. After distilling off the alcohol in vacuo the mixture is finally poured into 1200 ml. of water in which a precipitate of 3α,17α-dihydroxy-11,20-diketo-pregnane is formed. This precipitate is filtered off. Yield 91 g., or 97% of the theoretical. Melting-point 197–200° C. After crystallyization from acetone 86.2 g. of pure substance are obtained of melting-point 201–203° C.

*Example IV*

0.2 g. of 2,4,6-trinitro benzene sulphonic acid is added to a solution of 20 g. of 3β-acetoxy-11,20-diketo-allo-pregnane in 70 ml. of carbon tetrachloride and 30 ml. of acetic anhydride, after which the reaction mixture is left to stand at 0° C. for 4 hours. Then the mixture is processed as described in Example I, in which a solution of $\Delta^{17(20)}$-3β,20-diacetoxy-11-keto-allo-pregnene in carbon tetrachloride is obtained. According to paper chromatographic analysis of a sample of this solution the desired enol acetate has been obtained in a yield of 97.5% of the theoretical.

According to the process described in Example III the thus obtained compound is converted into the 3β,17α-dihydroxy-11,20-diketo-allo-pregnane in a yield of 18.2 g. After crystallization from acetone 17.1 g. of the pure substance is obtained with $[\alpha]_D = +60°$ (dioxane).

In an analogous manner 3β,17α-dihydroxy-11,20-diketo-allo-pregnane is obtained starting from 3β-acetoxy-11,20-diketo-allo-pregnane by replacing the acetic anhydride used above by an equivalent quantity of propionic anhydride.

*Example V*

1.5 g. of ortho-nitro benzene sulphonic acid is added to a solution of 10 g. of 3β-acetoxy-11,20-diketo-allo-pregnane in 40 ml. 1,2-dichloro ethane and 7.5 ml. of propionic anhydride. This mixture is left to react at 50° C. for 15 hours, after which it is poured into water.

The mixture is further treated as described in Example I to give 3β,17α-dihydroxy-11,20-diketo-allo-pregnane.

*Example VI*

2 g. of 2,4-dinitro benzene sulphonic acid are added to a solution of 50 g. of 3α-acetoxy-11,20-diketo-pregnane in 375 ml. of 1,2-dichloro-ethane and 125 ml. of acetic anhydride. Subsequently this mixture is left to react at 50° C. for 6 hours after which this reaction mixture is processed further to 3α,17α-dihydroxy-11,20-diketo-pregnane as described in Example I.

*Example VII*

1 g. of 2,4-dinitro benzene sulphonic acid is added to a solution of 10 g. of 3α-acetoxy-11,20-diketo-16α-methyl pregnane in 35 ml. of carbon tetrachloride and 15 ml. of acetic anhydride. This mixture is left to react at 25° C. for 30 hours, after which, in accordance with the process described in Example I, the 3α,17α-dihydroxy-11,20-diketo-16α-methyl pregnane is obtained.

*Example VIII*

1 g. of 2,4-dinitro benzene sulphonic acid is added to a solution of 10 g. of 3β-acetoxy-11,20-diketo-allopregnane in 35 ml. of 1,2-dichloro ethane and 5 ml. of acetic anhydride. This mixture is left to react at 25° C. for 6 hours, after which it is poured into water. Then the mixture is processed as described in Example I. Obtained is the same yield as in Example II.

*Example IX*

2 g. of 2,6-dinitro-para toluene sulphonic acid are added to a solution of 50 g. of 3α-acetoxy-11,20-diketo-pregnane in 375 ml. of 1,2-dichloro ethane and 125 ml. of acetic anhydride. Subsequently this mixture is left to react at 50° C. for 8 hours after which this reaction mixture is processed further to 3α,17α-dihydroxy-11,20-diketo-pregnane as described in Example I.

*Example X*

0.3 g. of 2,4,6-trinitro benzene sulphonic acid is added to a solution of 10 g. of 3β-acetoxy-11,20-diketo-allopregnane in 35 ml. of 1,2-dichloro ethane and 5 ml. of acetic anhydride. This mixture is left to react at 25° C. for 1 hour, after which it is poured into water. Then the mixture is processed as described in Example I. Obtained is the same yield as in Example IV.

*Example XI*

0.25 g. of 2,4,6-trinitro benzene sulphonic acid is added to a solution of 50 g. of 3α-acetoxy-11,20-diketo-pregnane in 375 ml. of 1,2-dichloro ethane and 125 ml. of acetic anhydride. Subsequently this mixture is left to react at 25° C. for 150 minutes after which this reaction mixture is processed further to 3α,17α-dihydroxy-11,20-diketo-pregnane as described in Example III.

*Example XII*

0.3 g. of 2,4,6-trinitro benzene sulphonic acid is added to a solution of 10 g. of 3α-acetoxy-11,20-diketo-16α- methyl pregnane in 35 ml. of carbon tetrachloride and 15 ml. of acetic anhydride. This mixture is left to react at 25° C. for 4.5 hours, after which, in accordance with the process described in Example III, the 3α,17α-dihydroxy-11,20-diketo-16α-methyl pregnane is obtained.

*Example XIII*

5 g. of 2,4-dinitro naphthyl sulphonic acid are added to a solution of 20 g. of 3β-acetoxy-11,20-diketo-allo-pregnane in 75 ml. of carbon tetrachloride and 30 ml. of acetic anhydride, after which the reaction mixture is left to stand at room temperature for 20 hours. According to the process described in Example I the reaction mixture is futher treated to obtain 3β,17α-dihydroxy,11,20-diketo-allo-pregnane with $[\alpha]_D = +60°$ (dioxane).

*Example XIV*

1 g. of 2,6-dinitro-para toluene sulphonic acid are added to a solution of 15 g. of 3β-hydroxy-11,20-dikto-allo-pregnane in 65 ml. of carbon tetrachloride and 55 ml. of acetic anhydride, after which the reaction mixture is left to react at 50° C. for 12 hours. The mixture is further treated as described in Example I to give 3β,17α-dihydroxy-11,20-diketo-allo-pregnane.

We claim:

Process for the preparation of 20-mono-enol acylates of 11,20-diketo-steroids comprising reacting an in ring A saturated 11,20-diketo-seroid selected from the group consisting of the pregnane and allopregnane series substituted in 3-position by a group selected from a hydroxy and acyloxy group, with a carboxylic anhydride in the presence of an organic solvent and a compound of the general formula:

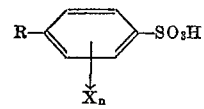

in which R is selected from the group consisting of hydrogen and a methyl group, X is a nitro group, and $n$ is an integer from 1 to 3.

References Cited in the file of this patent

UNITED STATES PATENTS

| | | |
|---|---|---|
| 2,694,078 | Ott et al. | Nov. 9, 1954 |
| 2,751,398 | Hunt et al. | June 19, 1956 |
| 2,825,735 | Rosenkranz et al. | Mar. 4, 1958 |
| 2,898,351 | Middelbeck et al. | Aug. 4, 1959 |